(No Model.)  2 Sheets—Sheet 1.
F. HOLDEN.
ELECTRICAL MEASURING INSTRUMENT.

No. 542,258. Patented July 9, 1895.

WITNESSES.
Henry Westendorf.
S. J. Johnston.

INVENTOR.
Frank Holden, by
Geo. R. Blodgett,
Atty.

(No Model.)
2 Sheets—Sheet 2.
F. HOLDEN.
ELECTRICAL MEASURING INSTRUMENT.
No. 542,258. Patented July 9, 1895.
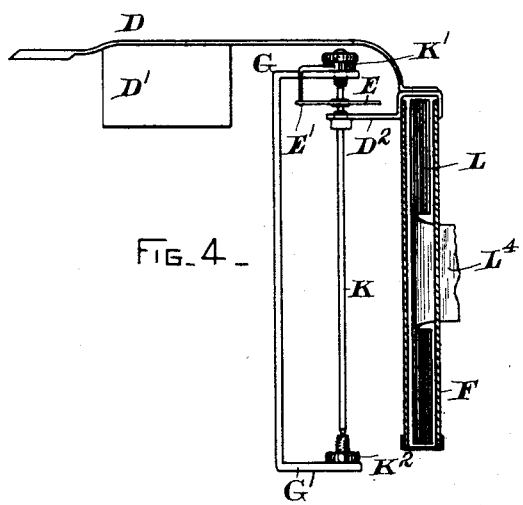
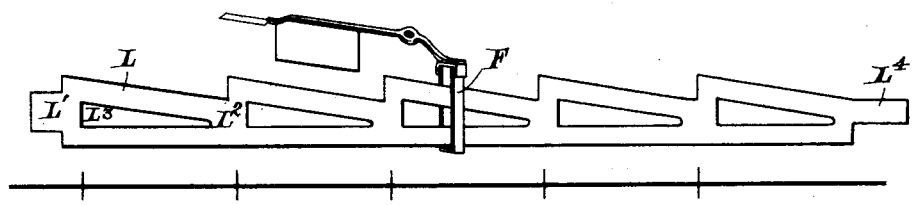
WITNESSES—
INVENTOR—

UNITED STATES PATENT OFFICE.

FRANK HOLDEN, OF SCHENECTADY, NEW YORK, ASSIGNOR, BY MESNE ASSIGNMENTS, TO THE GENERAL ELECTRIC COMPANY, OF SAME PLACE.

ELECTRICAL MEASURING-INSTRUMENT.

SPECIFICATION forming part of Letters Patent No. 542,258, dated July 9, 1895.

Application filed January 22, 1895. Serial No. 535,753. (No model.)

*To all whom it may concern:*

Be it known that I, FRANK HOLDEN, a citizen of the United States, residing at Schenectady, in the county of Schenectady and State of New York, have invented certain new and useful Improvements in Electrical Measuring-Instruments, of which the following is a specification.

My invention relates to instruments designed to measure either electric current or potential, commonly called "ammeters" or "voltmeters," according to the use for which they are designed. I have illustrated and described it as applied to an ammeter; but I do not mean to exclude from the scope of my claims the same construction when applied to measuring potential.

My invention has for its object to produce an instrument which shall be accurate and sensitive, strongly constructed, capable of being removed from the base upon which it is ordinarily mounted without deranging the mechanism, and yet of small cost in construction, to which ends I employ for the conductor a slotted ribbon of copper, which I wind upon itself, so that the slots register and enable me to bring the inner terminal of the coil through the coil, so that it may be secured readily in place. This coil I affix firmly to the binding-posts, through which the current enters. The coil has a tapering form, as presently described, and the strip from which it is made is preferably made in double serrated shape, as will be more readily understood from the drawings. Concentric with the coil I mount a needle or index, carrying upon one end a yoke of magnetic material, furnishing the motive power for the index, as presently explained. The action of the yoke is opposed by a spring of suitable form, tending to return the needle to the zero of the scale.

My invention also consists in improved constructions more fully pointed out in the description and claims annexed to this specification.

In the accompanying drawings, showing an embodiment of my invention, like letters refer to like parts throughout, wherein—

Figure 1:
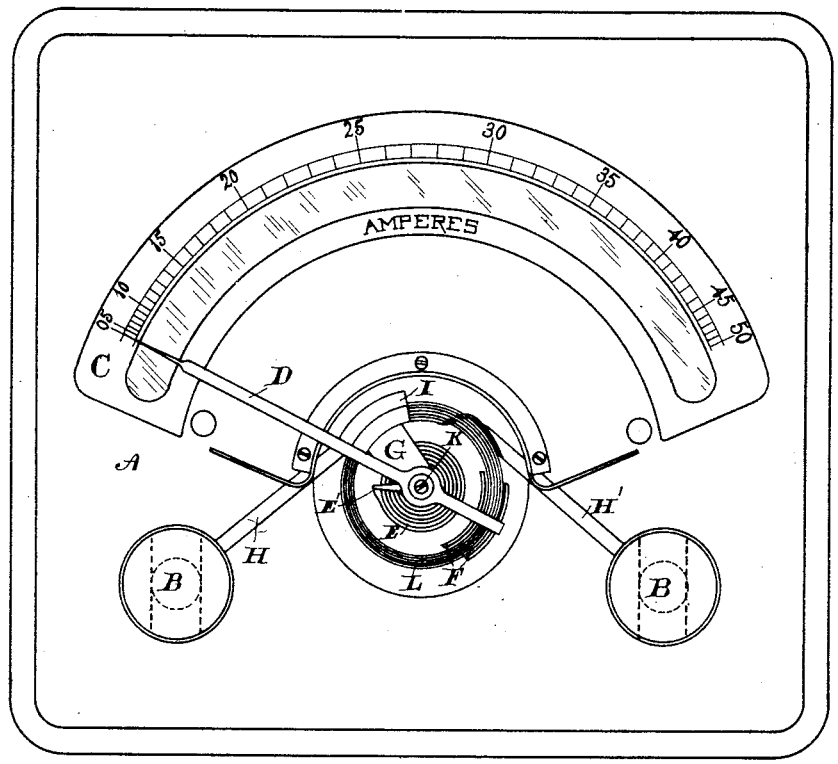
Figure 2:
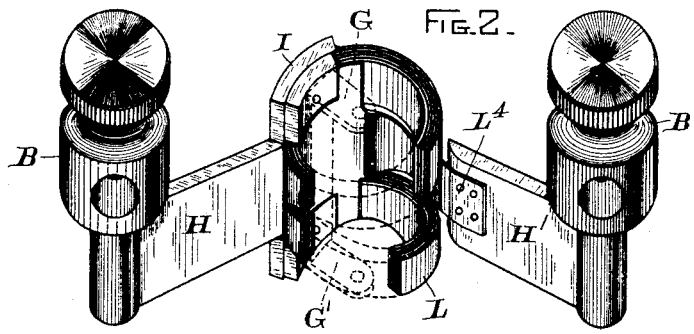
Figure 3:
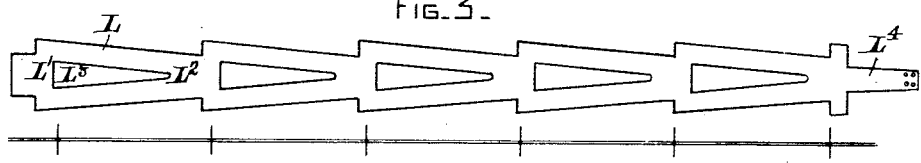

Figure 1 is a front elevation, partly diagrammatic, of an ammeter constructed in accordance with the principles of my invention; Fig. 2, a perspective detail, partly broken away, showing the coil attached to the binding-posts. Fig. 3 is a development of the copper-strip, of which the field-coil shown in Fig. 2 is composed. Fig. 4 is an enlarged detail showing the arrangement of the needle or index and the method of mounting, and Fig. 5 is a development of a modified form of strip adapted to the construction of the field-coil.

My invention is to some extent based upon the principles of and designed to be an improvement upon the well-known Thomson ammeter and voltmeter, as illustrated in the patent to Elihu Thomson, No. 413,292, dated October 22, 1889.

Referring by letter to the drawings, A is the base, to which the parts are affixed.

B B are binding-screws, to which the circuit-wires conveying the current to be measured are attached.

$c$ is the scale of the instrument.

D is the needle or index, reciprocating over the scale and furnishing the means of indicating the strength of current. The needle is mounted upon a suitable pivot, as best seen in Fig. 4, wherein K represents the shaft, carrying the needle, which is affixed thereto by the arm $D^2$.

E is a spiral spring, one end of which is affixed to the shaft K and the other is attached to the projecting lug $E'$.

Adjusting-screws $K'$ $K^2$ are carried upon the supports G $G'$, and a part F, of magnetic material, is attached to the needle, so as to swing therewith. The weight of this part is partly counterbalanced by the needle itself, and also by the vane $D'$, which furnishes a ready means of damping the oscillations of the needle under fluctuations of current.

The spring E is preferably made of non-magnetic material, and I have not found it necessary to make any compensating adjustment for changes of temperature with this form of spring.

Referring again to Figs. 1 and 2, H H' are solid pieces of conducting material projecting from the binding-screws, and to which the ends of the coil conveying the current are secured by some form of connection making good electrical contact. One of these projecting parts is provided with an enlargement I, to which the outer end of the coil is secured, and to which also the needle-support G G' is attached, while the inner end of the coil (shown at $L^4$) is attached to the other binding-screw by means of the projecting part H'.

All the parts just described are firmly attached to one another, and should it be necessary for any reason they may be removed from the carrying-base with no liability to derangement.

Referring now to Figs. 3 and 5, I illustrate the form of the copper strip from which the coil is constructed. L indicates the strip, which, as shown, is of serrated form, L' indicating the broader parts of the strip, $L^2$ the narrower portions, $L^3$ triangular slots adapted to register when the strip is rolled up, and $L^4$ the projecting tongue, forming the inner terminal of the coil, which, as illustrated in Fig. 2, is brought through the perforations $L^3$, when the coil is finally assembled. It is of course to be understood that insulation is applied between the several turns of the coil, so that a short-circuit may not be established. In Fig. 5 I illustrate a modification of the form of strip shown in Fig. 3, the serrations being only upon one side of the strip. With this arrangement I am enabled to close the magnetic circuit through the part F, inasmuch as there is substantially no change in the lines of force or magnetic condition at this part of the coil. When, however, the form shown in Fig. 3 is used, I prefer to unite the plates of the magnetic part F by means of a non-magnetic substance—such as a strip of paper or other insulating material—so that when the instrument is used to measure alternating currents these may not set up a vibration in the thin strips of metal composing the yoke or portion F.

When the instrument is assembled, the coil tapers from a point on its circumference around such circumference to the same point—that is to say, a shoulder or break is provided in assembling the strips, (illustrated in Figs. 3 and 5,) so that the coil has less depth at one point than at the next in its circumference. This enables me to mount the needle carrying the magnetic piece concentrically with the coil, at the same time getting an accurate and reliable action under variations of current. Where the form of strip shown in Fig. 3 is employed, it is necessary that the magnetic yoke or piece F should be left open upon one side, inasmuch as the action of the instrument is dependent upon the principle set up in the patent to Elihu Thomson before referred to—that is to say, upon the tendency of the magnetic lines to take the shortest path from one piece of magnetic material to another—so that as the current in the coil L sets up a magnetic field the yoke-piece F tends to take such a position in the field as will allow the magnetic lines of force to pass directly from the end of one of the plates of which it is composed to the other, and thus tends to move to the narrowest point or point of least depth of the coil L.

In the manufacture of the copper strips shown in Figs. 3 and 5 it is desirable, as indicated by the scales drawn thereunder, to make each successive portion of them just enough longer than the one preceding to bring the apertures $L^3$ $L^3$ into coincidence when the strip is assembled. This I believe to be new with me. I also believe the method of assembling the coil herein pointed out to be new—that is, by winding about itself a strip of conducting material provided with apertures adapted to register with one another, and then passing the inner terminal of the coil through these registering-apertures, so that both terminals of the coil are upon its outside and readily attachable to the other parts of the apparatus. I also believe it to be new to arrange the plates or laminæ of the magnetic yoke F parallel with the axis of the coil, and as by this I get uniformity of action I believe this to be of great utility.

Changes may readily be made in my improved apparatus without departing from the principles of construction set out, and such changes I aim to embrace. In instruments designed for large currents the number of turns of the coil L may be reduced, while conversely, where the current is small, this number should be increased. As an example, merely, without limiting myself to the proportions stated, I have found one turn to be sufficient for current of a hundred ampères or more, for fifty ampères three turns, for twenty-five ampères ten or twelve turns, &c. Such changes of proportion are well understood by those versed in the art, and need not be further explained.

What I claim as new, and desire to secure by Letters Patent of the United States, is—

1. In an electric measuring instrument, a field-coil, an index mounted in the axis of the coil, and a yoke of magnetic material carried by the index, the sides of the yoke being parallel to the axis of the coil.

2. In an electric measuring instrument, a field-coil deeper at one part of its circumference than at another, an index mounted in the axis of the coil, and a yoke of magnetic material carried by the index, the sides of the yoke being arranged to embrace the coil and being parallel to the axis thereof.

3. An electric measuring instrument comprising a field-coil deeper at one part of its circumference than at another, binding posts mechanically and electrically united therewith, an index mounted in the axis of the coil and carrying a yoke of magnetic material, and a spring opposing the motion of the index; the parts being mechanically united so that they may be removed from the supporting base without derangement, substantially as set out herein.

4. A field-coil for an electric measuring instrument, composed of a strip of conducting material having registering perforations through which the inner terminal of the coil is passed.

5. A field-coil for an electric measuring instrument, composed of a serrated strip of conducting material having registering perforations through which the inner terminal of the coil is passed.

6. As a new article of manufacture, a serrated strip of conducting material for the field-coil of an electric measuring instrument, having perforations adapted to register when the strip is coiled.

7. As a new article of manufacture, a strip of conducting material for the field-coil of an electric measuring instrument, having serrated edges and perforations adapted to register when the strip is coiled.

8. In an electric measuring instrument, a yoke of magnetic material carried by the index and adapted to embrace the field-coil, the yoke having the ends of its sides united by a piece of non-magnetic material; whereby vibration of such sides is prevented.

In witness whereof I have hereunto set my hand this 16th day of January, 1895.

FRANK HOLDEN.

Witnesses:
B. B. HULL,
A. F. MACDONALD.